(12) United States Patent
Park et al.

(10) Patent No.: US 10,873,095 B2
(45) Date of Patent: Dec. 22, 2020

(54) DRIVING PRESSURE ADJUSTING VALVE DEVICE FOR FUEL CELL SYSTEM

(71) Applicants: HYUNDAI MOTOR COMPANY, Seoul (KR); KIA MOTORS CORPORATION, Seoul (KR)

(72) Inventors: Jeong Hee Park, Suwon-si (KR); Byeong Seung Lee, Seoul (KR); Kyoung Ku Ha, Anyang-si (KR); Hyunyoo Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 264 days.

(21) Appl. No.: 16/144,248

(22) Filed: Sep. 27, 2018

(65) Prior Publication Data

US 2019/0326617 A1    Oct. 24, 2019

(30) Foreign Application Priority Data

Apr. 18, 2018  (KR) ........................ 10-2018-0044821

(51) Int. Cl.
| | |
|---|---|
| *H01M 8/04* | (2016.01) |
| *H01M 8/04089* | (2016.01) |
| *H01M 8/04746* | (2016.01) |
| *H01M 8/04119* | (2016.01) |
| *F16K 1/32* | (2006.01) |

(52) U.S. Cl.
CPC ... *H01M 8/04104* (2013.01); *H01M 8/04097* (2013.01); *H01M 8/04141* (2013.01); *H01M 8/04761* (2013.01); *H01M 8/04783* (2013.01); *F16K 1/32* (2013.01)

(58) Field of Classification Search
CPC ......... H01M 8/04104; H01M 8/04141; H01M 8/04761; H01M 8/04783; F16K 1/205; F16K 47/02; F16K 47/045; F16K 47/08
USPC ........................................................ 429/413
See application file for complete search history.

(56) References Cited

U.S. PATENT DOCUMENTS

| | | | | |
|---|---|---|---|---|
| 5,480,123 A | * | 1/1996 | Bey ........................... | F16K 1/22 |
| | | | | 251/127 |
| 2008/0237515 A1 | * | 10/2008 | Siame ..................... | F16K 1/222 |
| | | | | 251/127 |
| 2015/0188161 A1 | * | 7/2015 | Kwon ................ | H01M 8/04111 |
| | | | | 429/446 |
| 2015/0292627 A1 | * | 10/2015 | Yamada .................. | F16K 31/54 |
| | | | | 251/305 |
| 2016/0152114 A1 | * | 6/2016 | Yamamoto ............ | F16K 15/031 |
| | | | | 454/162 |

(Continued)

FOREIGN PATENT DOCUMENTS

| | | |
|---|---|---|
| JP | 5219206 B2 | 6/2013 |
| JP | 2015-203444 A | 11/2015 |

(Continued)

*Primary Examiner* — James M Erwin
(74) *Attorney, Agent, or Firm* — Morgan, Lewis & Bockius LLP

(57) ABSTRACT

A valve device includes: a valve housing having a valve passage connected with an air flow passage; a valve disk rotatably disposed inside the valve housing through a valve driver and changing air flow cross-section of the valve passage; and a porous member installed at the valve disk and positioned in an open section between the valve disk and the valve passage.

13 Claims, 7 Drawing Sheets

(56) References Cited

U.S. PATENT DOCUMENTS

2016/0341334 A1* 11/2016 Gattavari .............. F16K 5/0605
2018/0166712 A1* 6/2018 Park .................. H01M 8/04395

FOREIGN PATENT DOCUMENTS

| KR | 20-0257281 | 12/2001 |
| KR | 10-1364676 | 2/2014 |

* cited by examiner

DRIVING PRESSURE ADJUSTING VALVE DEVICE FOR FUEL CELL SYSTEM

CROSS-REFERENCE TO RELATED APPLICATION

This application claims priority to and the benefit of Korean Patent Application No. 10-2018-0044821 filed in the Korean Intellectual Property Office on Apr. 18, 2018, the entire contents of which are incorporated herein by reference.

TECHNICAL FIELD

The present disclosure relates to a valve device. More particularly, the present disclosure relates to a valve device for adjusting driving pressure provided at an exhaust system of a fuel cell system.

BACKGROUND

In general, a fuel cell system is a power generation system generating electrical energy through an electrochemical reaction of hydrogen and oxygen (oxygen in the air) by a fuel cell. For example, the fuel cell system is applied to a fuel cell vehicle to drive an electric driving source such as an electric motor.

The fuel cell system includes a stack, which is formed of an electricity generation assembly of unit fuel cells composed of a cathode and an anode, an air supply system for supplying air to the cathode of the fuel cell, a hydrogen supply system for supplying hydrogen to the anode of the fuel cell, and a water managing device for controlling of driving temperature of the stack and cooling.

In this fuel cell system, the air supply system includes an air compressor for intaking and compressing outdoor air to supply the compressed air to the cathode of the fuel cell and a for humidifying air supplied from the air compressor to maintain to make the air to be proper humidity.

Here, the humidifier humidifies the air supplied from the air compressor by using moisture in an exhausted air from the cathode of the fuel cell, and supplies the humidified air to the cathode of the fuel cell.

The fuel cell system includes an exhaust system for releasing air (it may be called as 'exhaust gas') exhausted from the humidifier of the air supply system to atmosphere. This exhaust system includes a pressure adjusting device which changes air flow cross-section of an air exhaust passage during driving of the fuel cell system to adjust pressure of the fuel cell stack.

For example, a pressure adjusting device according to a conventional art may be a valve of a butterfly type provided at an exhaust passage of an exhaust system. This valve device rotates a valve disk and adjusts a pressure of the fuel cell stack by a method of changing a clearance between the valve disk and a bore.

By the way, in this valve device according to the conventional art, air is exhausted from the clearance between the valve disk and the bore, therefore turbulence of the air is generated at the clearance, an air velocity increases through the clearance, and noise of air current may increase.

The above information disclosed in this Background section is only for enhancement of understanding of the background of the invention and therefore it may contain information that does not form the prior art that is already known in this country to a person of ordinary skill in the art.

SUMMARY

The exemplary embodiments of the present disclosure provide a valve device which reduces noise of air current generated from flow velocity getting fast in a specific section and turbulence of the air during adjusting pressure.

A valve device according to an exemplary embodiment of the present disclosure includes: a valve housing having a valve passage connected with an air flow passage; a valve disk rotatably installed at the valve housing through a valve driver and changing air flow cross-section of the valve passage; and a porous member attached to the valve disk and disposed in an open section between the valve disk and the valve passage.

The valve passage of the valve housing may be connected with an air flow passage of an exhaust system for releasing an air exhausted from a humidifier of a fuel cell system to atmosphere.

The valve device may change the air flow cross-section of the valve passage through the valve disk and adjust a pressure of the fuel cell stack.

The valve disk may be tilted around a valve shaft connected with the valve driver and provided as a flap disk type changing the air flow cross-section of the valve passage.

The porous member may be installed at one surface of the valve disk corresponding to an opening end of the valve passage.

The porous member may include a mesh foam having a predetermined porosity.

The valve disk may have open sections having a different area from each other with respect to the valve passage.

The porous member may have a different porosity in the open section having a small area from in the open section having a large area.

The porous member may have a porosity of being getting smaller as the area of the open section becomes larger.

A valve device according to another exemplary embodiment of the present disclosure includes: a valve housing provided with a valve passage connected with an air flow passage; a valve disk rotatably installed at the valve housing through a valve driver and changing air flow cross-section of the valve passage; a porous member installed at the valve disk and positioned in an open section between the valve disk and the valve passage; and a mesh plate installed at the valve passage and supporting the porous member. The valve disk may compress and restore the porous member by rotation of the valve disk between the valve disk and the mesh plate.

The porous member may be compressed by the valve disk in a state of being supported by the mesh plate, and a porosity may change according to a degree of compression.

A valve device according to still another exemplary embodiment of the present disclosure includes: a valve housing provided with a valve passage connected with an air flow passage; a valve disk rotatably installed at the valve housing through an operation portion and changing air flow cross-section of the valve passage; a mesh plate installed at the valve passage and supporting the porous member; and a porous member installed at one side of the mesh plate corresponding to the valve disk and positioned in an open section between the valve disk and the valve passage.

The porous member may be provided to be compressed and restored by rotation of the valve disk between the valve disk and the mesh plate.

The porous member may be compressed by the valve disk in a state of being supported by the valve disk, and a porosity may change according to a degree of compression.

The porous member includes a mesh foam.

According to the exemplary embodiments of the present disclosure, generation of turbulence of the air may be reduced by the porous member, and flow velocity of the air may be prevented from being getting fast in a specific section, therefore noise of air current may be reduced.

In addition, an effect that can obtain or that is estimated with an exemplary embodiment of the present disclosure is directly or suggestively described in a detailed description of an exemplary embodiment of the present disclosure. That is, various effects that are estimated according to an exemplary embodiment of the present disclosure will be described within a detailed description to be described later.

BRIEF DESCRIPTION OF THE DRAWINGS

The accompanying drawings are provided in order to describe exemplary embodiments of the present disclosure, such that technical idea of the present disclosure is not limited to the accompanying drawings.

DETAILED DESCRIPTION OF THE EMBODIMENTS

Figure 1:
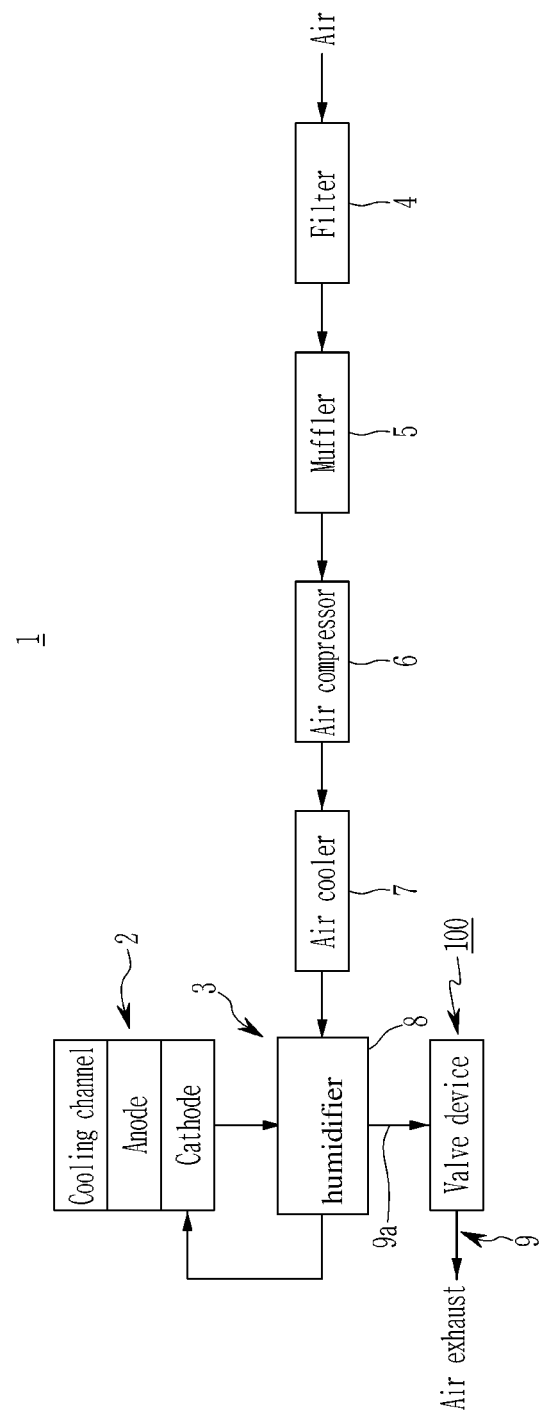
FIG. 1 is a block diagram schematically showing a fuel cell system to which a valve device according to an exemplary embodiment of the present disclosure is applied.

The present disclosure will be described more fully hereinafter with reference to the accompanying drawings, in which exemplary embodiments of the invention are shown, so that those skilled in the art may easily practice the present disclosure. As those skilled in the art would realize, the described embodiments may be modified in various different ways, all without departing from the spirit or scope of the present disclosure.

In order to clarify the present disclosure, parts that are not connected with the description will be omitted, and the same elements or equivalents are referred to with the same reference numerals throughout the specification.

The size and thickness of each element are arbitrarily shown in the drawings for convenience of explanation, but the present disclosure is not necessarily limited thereto, and in the drawings, the thickness of portions, regions, etc. are exaggerated for clarity.

Moreover, the use of the terms first, second, etc. are used to distinguish one element from another, and are not limited to the order in the following description.

In addition, unless explicitly described to the contrary, the word "comprise" and variations such as "comprises" or "comprising", will be understood to imply the inclusion of stated elements but not the exclusion of any other elements.

Further, the terms 'unit', 'means', '-er (-or)', 'member', etc., described in the specification indicate a comprehensive configuration unit for performing at least one function or operation.

FIG. 1 is a block diagram schematically showing a fuel cell system to which a valve device according to an exemplary embodiment of the present disclosure is applied.

Referring to FIG. 1, a valve device 100 according to an exemplary embodiment of the present disclosure may be applied to a fuel cell system 1.

The fuel cell system 1 is a generator producing electrical energy by an electrochemical reaction between hydrogen and air. For example, this fuel cell system may be included in a fuel cell vehicle driving an electric motor by the electrical energy.

The fuel cell system 1 basically includes a fuel cell stack 2 (hereinafter, it will be called as "a stack") including an anode, a cathode, and a cooling channel and an air supply system 3 for supplying an air to the fuel cell stack 2.

For example, the air supply system 3 includes a filter 4 filtering foreign material of outside air, a muffler 5 reducing absorption noise of the outside air, an air compressor 6 intaking and compressing the outside air, an air cooler 7 cooling the exhausted air from the air compressor 6, and a humidifier 8 humidifying the air from the air cooler 7 to have a proper humidity to supply the cathode of the fuel cell stack 2.

Since the filter 4, the muffler 5, the air compressor 6, and the air cooler 7 as described above are known in the art, a detailed description thereof will be omitted in the present specification.

Here, the humidifier 8 humidifies by exchanging moisture between an exhausted air containing moisture exhausted from the cathode of the fuel cell stack 2 and the supplying air supplied from the air compressor 6, and the humidified air may be supplied to the cathode of the fuel cell stack 2.

In addition, the fuel cell system 1 according to the exemplary embodiment of the present disclosure further includes an exhaust system 9 for releasing the air exhausted from the humidifier 8 of the air supply system 3.

In the valve device 100 according to an exemplary embodiment of the present disclosure, the exhausted air of the humidifier 8 flows in the exhaust system 9 of the fuel cell system 1, and the valve device 100 may be installed at the air flow passage 9a for releasing the air to an atmosphere.

In the valve device 100 according to an exemplary embodiment of the present disclosure, air flow cross-section of the air flow passage 9a varies during driving of the fuel cell system 1, and the valve device 100 may act as a pressure adjusting device adjusting the pressure of the fuel cell stack.

However, it should not be understood that the scope of the present disclosure is necessarily limited thereto, and the technical spirit of the present disclosure may be applied to various types of valve device for various uses, such as a valve device changing the cross-section of the air flow passage and adjusting the pressure.

In the valve device 100 according to an exemplary embodiment of the present disclosure, the flow cross-section of the air flow passage 9a changes to reduce noise of air current generated from flow velocity getting fast in a specific section and turbulence of the air during adjusting pressure.

Figure 2:
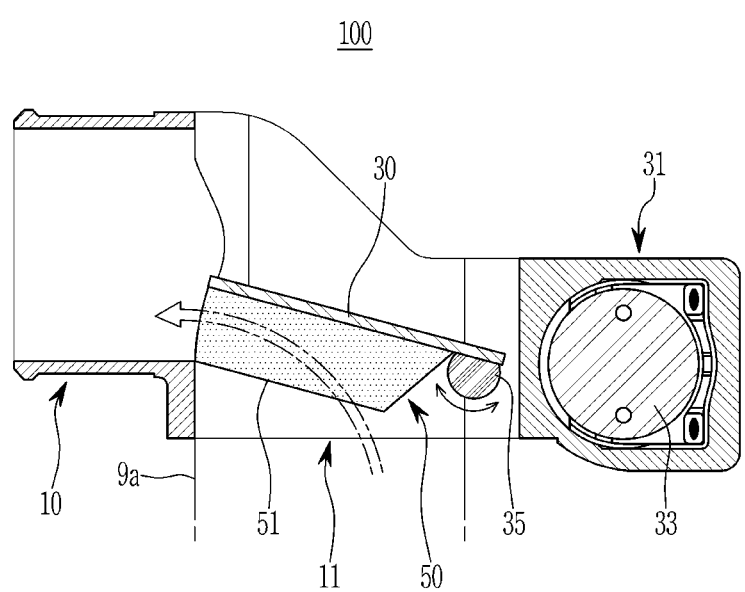
FIG. 2 is a cross-sectional configuration diagram showing a valve device according to an exemplary embodiment of the present disclosure.

FIG. 2 is a cross-sectional configuration diagram showing a valve device according to an exemplary embodiment of the present disclosure.

Referring to FIG. 2, the valve device 100 according to an exemplary embodiment of the present disclosure basically includes a valve housing 10, a valve disk 30, and a porous member 50, and each of the components will be described below.

In an exemplary embodiment of the present disclosure, the valve housing 10 is installed at the air flow passage 9a in the exhaust system 9 (refer to FIG. 1) which is described above. The valve housing 10 has a valve passage connected with an air flow passage.

In an exemplary embodiment of the present disclosure, the valve disk 30 is for changing air flow cross-section of the valve passage 11, and rotatably installed at the valve housing 10 through a valve driver 31.

Here, the valve driver 31 includes a motor 33 and a valve shaft 35. The motor 33 is fixedly installed at the valve housing 10. The valve shaft 35 is connected with an operation shaft of the motor 33 through a gear portion (not shown in drawings). The gear portion is installed at the valve housing 10, and the gear portion may include a planetary gear set which reduces a rotational speed of the motor 33 to a predetermined speed.

Hereinafter, as shown in drawings, the valve disk 30 operates in an upper and lower directions by the valve driver 31, and portions facing an upper side may be defined as an upper portion, an upper end, an upper end portion, an upper end surface and an upper surface, and portions facing a lower side may be defined as a lower portion, a lower end, a lower end portion, a lower end surface and a lower surface.

However, the direction of orientation as used herein is relative only, and can be changed depending on the position of the valve housing 10 relative to the drawings. Accordingly, this direction of orientation is not limited to this exemplary embodiment.

The valve disk 30 opens and closes the valve passage 11 of the valve housing 10 by rotation of the valve shaft 35, and is provided as a disk of a square shape. For example, the valve disk 30 is tilted around the valve shaft 35 in upper and lower directions, and provided as a flap disk type changing the cross-section of air flow of the valve passage 11. The valve disk 30 may be combined to the valve shaft 35 by a bolt.

This valve disk 30 may change the air flow cross-section of the valve passage 11 by the rotation of the valve shaft 35 through operation of the motor 33, and adjust pressure of the fuel cell stack 2 (refer to FIG. 1).

In an exemplary embodiment of the present disclosure, the porous member 50 is installed at the valve disk 30, and positioned in an open section between the valve disk 30 and the valve passage 11.

The porous member 50 may include a mesh foam 51 which is made of a porous medium of a metal material having a predetermined porosity by a plurality of pores. For example, the mesh foam 51 may be made of a porous medium of various metal materials.

The porosity (magnitude degree of the pores) of the porous member 50 is selected by considering a differential pressure required to the fuel cell stack 2 (refer to FIG. 1), therefore the porosity is not limited to a specific value in the exemplary embodiment of the present disclosure.

This porous member 50 is installed at one surface (a lower surface in figures) of the valve disk 30 corresponding to an open end of the valve passage 11, and positioned in an open section between the valve disk 30 and the valve passage 11.

Hereinafter, the operation of the valve device 100 according to an exemplary embodiment of the present disclosure will be described on reference to the accompanying drawings.

Figure 3:
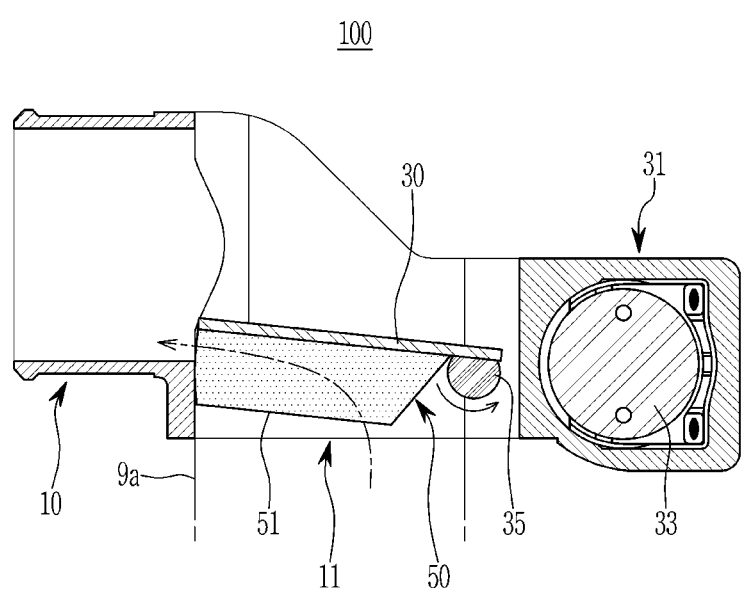
FIG. 3 is a diagram for describing an operation of a valve device according to an exemplary embodiment of the present disclosure.

FIG. 3 is a diagram for describing an operation of a valve device according to an exemplary embodiment of the present disclosure.

Referring to FIG. 3, firstly, in an exemplary embodiment of the present disclosure, the valve shaft 35 rotates in a predetermined angle by operation of the motor 33 during driving of the fuel cell system 1, and the air flow cross-section of the valve passage 11 changes through the valve disk 30 combined to the valve shaft 35.

At this time, in an exemplary embodiment of the present disclosure, a rotational angle of the valve shaft 35 is adjusted by controlling operation of the motor 33, and a portion of the valve passage 11 is opened by adjusting a rotational angle of the valve disk 30 to change the air flow cross-section of the valve passage 11.

Then, in an exemplary embodiment of the present disclosure, when the air exhausted from the humidifier 8 of the air supply system 3 flows along to the air flow passage 9a of the exhaust system 9, the air flow cross-section of the valve passage 11 connected with the air flow passage 9a changes, therefore pressure of the fuel cell stack may be adjusted.

In the process of the exemplary embodiment of the present disclosure, the porous member 50 is positioned in an open section between the valve disk 30 and the valve passage 11. That is, the porous member 50 is positioned in the open section of which a portion is opened by the valve disk 30.

Accordingly, the air flowing along the air flow passage 9a passes through the open section of the valve disk 30 and the valve passage 11. In this process, the air passes through the porous member 50, and is distributed uniformly by the pores of the porous member 50.

Accordingly, in an exemplary embodiment of the present disclosure, when the air passes through the open section between the valve disk 30 and the valve passage 11, turbulence of the air may be reduced by the porous member 50, and the air may be prevented from being getting faster in a specific section.

Accordingly, in an exemplary embodiment of the present disclosure, when the air flow cross-section of the valve passage 11 changes by the valve disk 30 and pressure is adjusted, turbulence of the flow air and current noise generated from the flow speed getting fast in a specific section may be reduced.

Figure 4A:
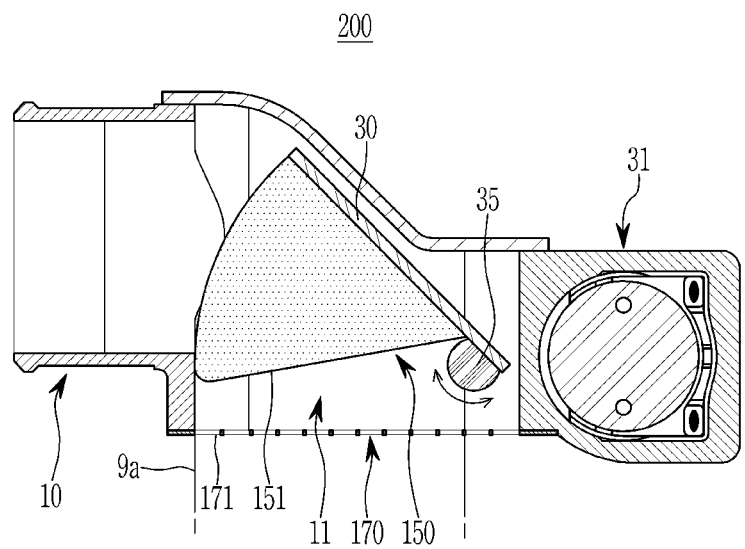
FIGS. 4A and 4B are cross-sectional configuration diagrams showing a valve device according to another exemplary embodiment of the present disclosure.
Figure 4B:
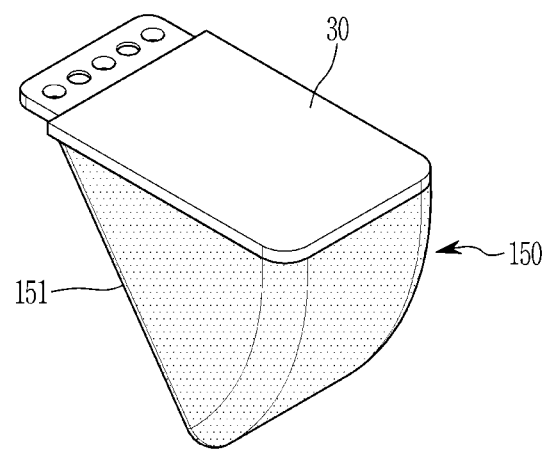

FIGS. 4A and 4B are cross-sectional configuration diagrams showing a valve device according to another exemplary embodiment of the present disclosure. In the drawings, same reference numbers designate same constituent elements through the exemplary embodiments in the specification.

Referring to FIGS. 4A and 4B, a valve device 200 according to another exemplary embodiment of the present disclosure basically has the structure of the above exemplary embodiment, and may include a porous member 150 which is compressed and restored by rotation of the valve disk 30 in an open section between the valve disk 30 and the valve passage 11.

That is, the valve device 200 according to another exemplary embodiment of the present disclosure has a structure which changes porosity of the porous member 150 according to a degree of compression, and adjusts a pressure.

Here, the structures of the valve housing 10 forming the valve passage 11 and the valve disk 30 rotating by the valve driver 31 are same with the structures of the above exemplary embodiments, and therefore, more specific description will be omitted.

In an exemplary embodiment of the present disclosure, the porous member 150 is installed at one surface (a lower surface in the drawings) of the valve disk 30 corresponding to the valve passage 11 of the valve housing 10 like the above exemplary embodiment, and positioned in the open section between the valve disk 30 and the valve passage 11.

The valve device according to the exemplary embodiment of the present disclosure further includes a mesh plate installed at the valve passage 11 and supporting the porous member 150. The mesh plate 170 has a plurality of mesh holes 171 and may be combined to and block the valve passage 11.

This mesh plate 170 uniformly distributes air inflowing to the valve passage 11 through the air flow passage 9a, and supports the porous member 150.

The porous member 150 is made of a porous medium having a plurality of pores, and provided to be compressed and restored by rotation of the valve disk 30 between the valve disk 30 and the mesh plate 170.

Here, the porous member 150 includes a mesh foam 151 made of a porous medium of metal material, and is compressed by rotation of the valve disk 30 in a state of being supported by the mesh plate 170, and a porosity may change according to a degree of compression.

Hereinafter, an operation of a valve device 200 according to another exemplary embodiment of the present disclosure will be specifically described by referring to the above and accompanying drawings.

Figure 5:
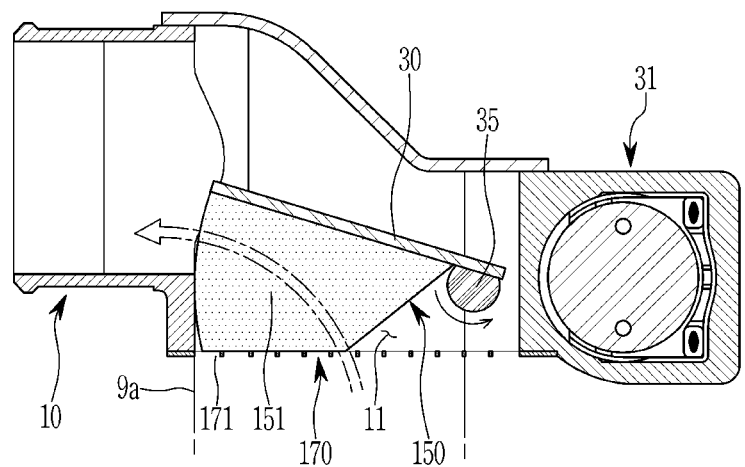
FIG. 5 is a diagram for describing an operation of a valve device according to another exemplary embodiment of the present disclosure.

FIG. 5 is a diagram for describing an operation of a valve device according to another exemplary embodiment of the present disclosure.

Firstly, in an exemplary embodiment of the present disclosure, as shown in FIG. 4, for example, the valve shaft 35 rotates in a predetermined angle by the valve driver 31, therefore the valve disk 30 rotates by about 45° on a reference with the open end of the valve passage 11 and a portion of the valve passage 11 is opened.

In this state, in an exemplary embodiment of the present disclosure, as shown in FIG. 5, for example, the valve shaft 35 rotates in a predetermined angle by the valve driver 31, therefore the valve disk 30 rotates by about 15° on a reference with the open end of the valve passage 11 and a portion of the valve passage 11 is opened.

Then, the porous member 150 is supported by the mesh plate 170 by rotation of the valve disk 30 between the valve disk 30 and the mesh plate 170 and is compressed and deformed.

Accordingly, in an exemplary embodiment of the present disclosure, amount of compression of the porous member 150 is adjusted according to rotation angle of the valve disk 30, and the pressure of the fuel cell stack 2 (refer to FIG. 1) may be adjusted by changing porosity of the porous member 150.

That is, in an exemplary embodiment of the present disclosure, when rotation angle of the valve disk 30 becomes larger, amount of compression of the porous member 150 decreases or restored, and porosity increases, therefore, differential pressure may be reduced.

Further, in an exemplary embodiment of the present disclosure, when rotation angle of the valve disk 30 becomes smaller, amount of compression of the porous member 150 increases, and porosity decreases, therefore, differential pressure may be increased.

In addition, in an exemplary embodiment of the present disclosure, the air flowing along the air flow passage 9a passes the porous member 150 positioned in the open section of the valve disk 30 and the valve passage 11, thereby, is uniformly distributed by the pores of the porous member 50.

Accordingly, in an exemplary embodiment of the present disclosure, when the air passes through the open section between the valve disk 30 and the valve passage 11, turbulence of the air may be reduced by the porous member 50, and the air may be prevented from being getting faster in a specific section.

Accordingly, in an exemplary embodiment of the present disclosure, turbulence of the flow air and current noise generated from the flow speed getting fast in a specific section may be reduced during when the pressure is adjusted.

Figure 6A:
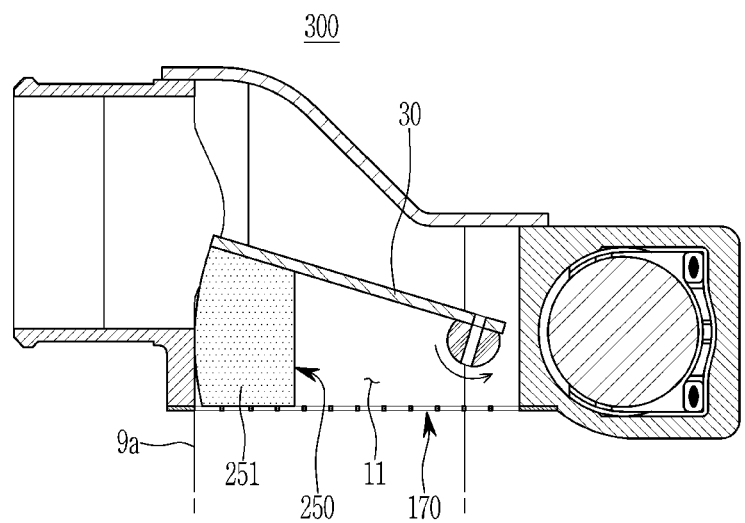
FIGS. 6A and 6B are cross-sectional configuration diagrams showing a valve device according to another exemplary embodiment of the present disclosure.
Figure 6B:
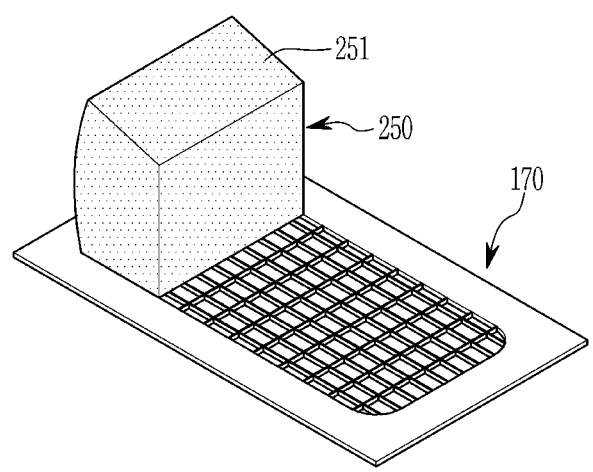

FIGS. 6A and 6B are cross-sectional configuration diagrams showing a valve device according to another exemplary embodiment of the present disclosure. In the drawings, same reference numbers designate same constituent elements through the exemplary embodiments in the specification.

Referring to FIGS. 6A and 6B, a valve device 300 according to another exemplary embodiment of the present disclosure basically has the structure of the above exemplary embodiment, and may include a porous member 250 installed at the mesh plate 170.

In the exemplary embodiment of the present disclosure, the porous member 250 is installed at one side of one surface (an upper surface in the drawing) of the mesh plate 170 corresponding to one surface (a lower surface in the drawing) of the valve disk 30.

The porous member 250 is positioned in an open section between the valve disk 30 and the valve passage 11, and is compressed and restored by rotation of the valve disk 30 between the valve disk 30 and the mesh plate 170.

Here, the porous member 250 includes a mesh foam 251 made of a porous medium of metal material, and is compressed by rotation of the valve disk 30 in a state of being supported by the valve disk 30, and a porosity may change according to a degree of compression.

Remaining structures of the valve device 300 according to another exemplary embodiment of the present disclosure and the effect are same with the other exemplary embodiment of the present disclosure, therefore more specific description will be omitted.

Figure 7:
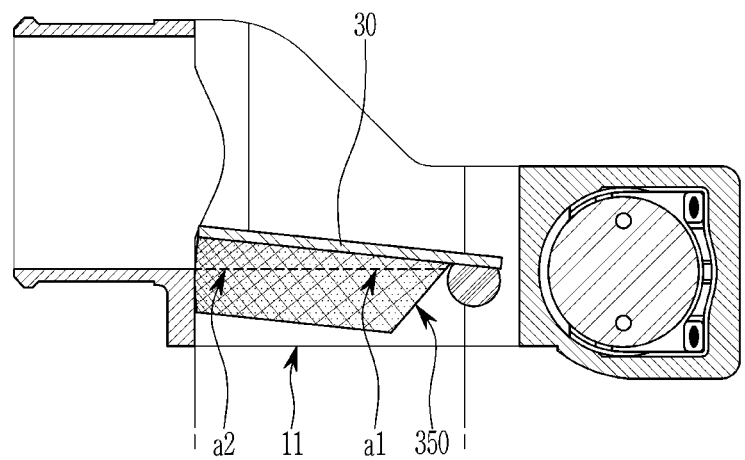
FIG. 7 is a diagram schematically showing variation examples of porous members applied to exemplary embodiments of the present disclosure.

FIG. 7 is a diagram schematically showing variation examples of porous members applied to exemplary embodiments of the present disclosure.

Referring to FIG. 7, the porous members 350 applied to the exemplary embodiments of the present disclosure are exemplary variations, and different porosity may be applied to a single body.

Here, the valve disk 30 is provided as a flap disk type, accordingly, open sections of different cross-section with the valve passage 11 are formed. Accordingly, the porous member 350 may have a different porosity in the open section a1 having a small area from in the open section a2 having a large area.

For example, the porous member 350 may have a porosity of being getting smaller as the area of the open section becomes larger. Here, the difference of the porosity may be defined as a difference of size of the pores. That is, the porous member 350 may have a size of pore of being getting smaller as the area of the open section becomes larger.

Accordingly, in the exemplary variation, the porous member 350 has different porosity in the different open areas having different cross-section between the valve disk 30 and the valve passage 11, therefore the air passing through the porous member 350 may be uniformly distributed.

Accordingly, in the exemplary variation, when the air passes through the open section between the valve disk 30 and the valve passage 11, turbulence of the air may be reduced by the porous member 350, and the air may be prevented from being getting faster in a specific section.

In the valve disk according to the exemplary embodiments of the present disclosure, the porous member is positioned in the open section between the valve disk and the valve passage as describe above, however, it is not limited to this, the porous member may be positioned in a section which the rotation angle of the valve disk is small (for example, below 10°).

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A valve device, comprising:
    a valve housing having a valve passage connected with an air flow passage of an exhaust system;
    a valve disk rotatably disposed to be spaced apart from the valve passage inside the valve housing through a valve driver and adjusting an air flow cross-section of the valve passage; and
    a porous member attached to the valve disk and disposed in an open section between the valve disk and the valve passage,
    wherein the porous member includes a mesh foam having a predetermined porosity.

2. The valve device of claim 1, wherein the exhaust system releases an air exhausted from a humidifier of a fuel cell system to atmosphere.

3. The valve device of claim 2, wherein the valve device changes the air flow cross-section of the valve passage through the valve disk and adjusts a pressure of a fuel cell stack of the fuel cell system.

4. The valve device of claim 1, wherein the valve disk is tilted around a valve shaft, which is connected with the valve driver, has a flap disk shape and changes the air flow cross-section of the valve passage.

5. The valve device of claim 1, wherein the porous member is attached to one surface of the valve disk corresponding to an opening end of the valve passage.

6. The valve device of claim 1, wherein the valve disk includes open sections, each of which having a different area from each other with respect to the valve passage, and
    wherein the porous member has a porosity in an open section having a smallest area among the open sections different from porosities of the remaining opening sections.

7. The valve device of claim 6, wherein the porous member has a porosity of being getting smaller as an area of each of the open sections becomes larger.

8. A valve device, comprising:
    a valve housing having a valve passage connected with an air flow passage;
    a valve disk rotatably installed at the valve housing through a valve driver and changing air flow cross-section of the valve passage;
    a porous member installed at the valve disk and positioned in an open section between the valve disk and the valve passage; and
    a mesh plate installed at the valve passage and supporting the porous member,
    wherein the porous member is provided to be compressed and restored by rotation of the valve disk between the valve disk and the mesh plate.

9. The valve device of claim 8, wherein the porous member is compressed by the valve disk in a state of being supported by the mesh plate, and a porosity changes according to a degree of compression.

10. A valve device, comprising:
    a valve housing provided with a valve passage connected with an air flow passage of an exhaust system;
    a valve disk rotatably disposed inside the valve housing through a valve driver and adjusting an air flow cross-section of the valve passage;
    a mesh plate installed at the valve passage and supporting the porous member; and
    a porous member attached to one side of the mesh plate corresponding to the valve disk and disposed in an open section between the valve disk and the valve passage,
    wherein the valve disk compresses and restores the porous member by rotation of the valve disk between the valve disk and the mesh plate.

11. The valve device of claim 10, wherein the porous member is compressed by the valve disk in a state of being supported by the valve disk, and a porosity changes according to a degree of compression.

12. The valve device of claim 8, wherein the porous member includes a mesh foam.

13. The valve device of claim 10, wherein the porous member includes a mesh foam.

* * * * *